(12) United States Patent
Michel et al.

(10) Patent No.: US 7,621,967 B2
(45) Date of Patent: Nov. 24, 2009

(54) BLUE DYE WITH PARTICULARLY HIGH PURITY AND POSITIVE TRIBOELECTRIC CONTROL EFFECT

(75) Inventors: Eduard Michel, Frankfurt am Main (DE); Ruediger Baur, Eppstein-Niederjosbach (DE); Hans-Tobias Macholdt, Darmstadt-Eberstadt (DE); Norbert Kohl, Muenster (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 565 days.

(21) Appl. No.: 10/533,999

(22) PCT Filed: Oct. 21, 2003

(86) PCT No.: PCT/EP03/11620

§ 371 (c)(1),
(2), (4) Date: May 4, 2005

(87) PCT Pub. No.: WO2004/041944

PCT Pub. Date: May 21, 2004

(65) Prior Publication Data

US 2006/0105265 A1    May 18, 2006

(30) Foreign Application Priority Data

Nov. 5, 2002 (DE) ................ 102 51 394

(51) Int. Cl.
    C09B 51/00    (2006.01)
(52) U.S. Cl. .................. 8/649; 8/506; 8/513; 430/105; 430/107.1; 106/31.27; 106/31.28
(58) Field of Classification Search .................. 8/637.1, 8/649, 506, 513; 430/45.1, 45.2, 105, 107.1; 106/31.27, 31.28
See application file for complete search history.

(56) References Cited

U.S. PATENT DOCUMENTS

| 3,652,602 A * | 3/1972  | Schafer et al. .............. 552/110 |
| 3,671,553 A   | 6/1972  | Pepenfuss et al. |
| 4,912,006 A   | 3/1990  | Breitschaft et al. |
| 5,021,473 A   | 6/1991  | Macholdt et al. |
| 5,061,585 A * | 10/1991 | Macholdt et al. ....... 430/108.21 |
| 5,069,994 A   | 12/1991 | Gitzel et al. |
| 5,110,518 A   | 5/1992  | Hatter |
| 5,147,748 A   | 9/1992  | Gitzel et al. |
| 5,342,723 A   | 8/1994  | Macholdt et al. |
| 5,378,571 A   | 1/1995  | Macholdt et al. |
| 5,401,809 A   | 3/1995  | Gitzel et al. |
| 5,475,119 A   | 12/1995 | Baur et al. |
| 5,502,118 A   | 3/1996  | Machholdt et al. |
| 5,554,722 A   | 9/1996  | Eichenauer et al. |
| 5,554,739 A   | 9/1996  | Belmont |
| 5,560,760 A   | 10/1996 | Toeppen |
| 5,563,016 A   | 10/1996 | Baur et al. |
| 5,585,216 A   | 12/1996 | Baur et al. |
| 5,871,845 A   | 2/1999  | Dahringer et al. |
| 5,922,118 A   | 7/1999  | Johnson et al. |
| 6,028,178 A   | 2/2000  | Metz et al. |
| 6,030,738 A   | 2/2000  | Michel et al. |
| 6,083,653 A   | 7/2000  | Baur et al. |
| 6,117,606 A   | 9/2000  | Macholdt et al. |
| 6,168,895 B1 * | 1/2001 | Metz et al. ............. 430/108.23 |
| 6,391,507 B1  | 5/2002  | Macholdt et al. |
| 6,406,528 B1  | 6/2002  | Macholdt et al. |
| 2002/0098435 A1 | 7/2002 | Rohr et al. |

FOREIGN PATENT DOCUMENTS

| DE | 4013610  | 5/1991  |
| DE | 4029652  | 3/1992  |
| DE | 4031705  | 4/1992  |
| DE | 4142541  | 6/1993  |
| DE | 4332170  | 3/1995  |
| DE | 4418842  | 12/1995 |
| DE | 19711260 | 9/1998  |
| DE | 19732995 | 2/1999  |
| EP | 0258651  | 3/1988  |
| EP | 0347695  | 2/1989  |

(Continued)

OTHER PUBLICATIONS

PCT ISR for PCT/EP 03/11620, Feb. 23, 2004.

(Continued)

*Primary Examiner*—Lorna M Douyon
*Assistant Examiner*—Amina Khan
(74) *Attorney, Agent, or Firm*—Anthony A. Bisulca

(57) ABSTRACT

A dye base sulfate and method of making are described. The dye base sulphate of formula (I) is produced with a residual amine content of less than 2000 ppm, as determined by HPLC, by precipitation of the dye base, made by Friedel-Crafts alkylation, substitution and hydrolysis, as the dye base sulphate is a) taken up in water and subjected to a first steam distillation then filtered and optionally dried at 50 to 180° C., b) the pressed cake is treated with water or the optionally dried dye base sulphate is moistened with water, c) subjected to a further steam distillation and filtration and d) dried at 50 to 180° C.

(1)

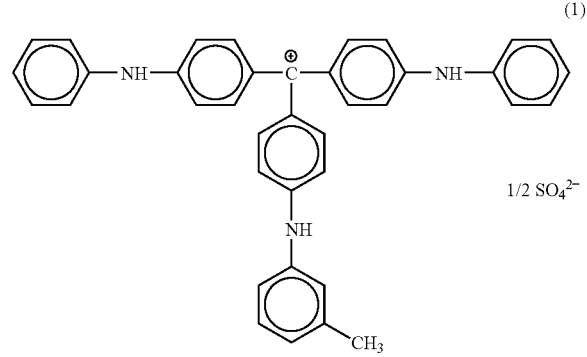

9 Claims, No Drawings

FOREIGN PATENT DOCUMENTS

| | | |
|---|---|---|
| EP | 0385580 | 9/1990 |
| EP | 0615007 | 9/1994 |
| EP | 0623941 | 11/1994 |
| EP | 0636945 | 2/1995 |
| EP | 0639611 | 2/1995 |
| EP | 0658819 | 6/1995 |
| EP | 0705886 | 4/1996 |
| EP | 0778501 | 6/1997 |
| EP | 0908789 | 4/1999 |
| EP | 1061419 | 12/2000 |
| EP | 1204005 | 5/2002 |
| WO | WO 8804442 | 6/1988 |
| WO | WO 8909833 | 10/1989 |
| WO | WO 91/10172 | 7/1991 |
| WO | WO 01/30919 | 5/2001 |
| WO | WO 01/40878 | 6/2001 |

OTHER PUBLICATIONS

English Abstract for JP 9106107, Apr. 22, 1997.

* cited by examiner

BLUE DYE WITH PARTICULARLY HIGH PURITY AND POSITIVE TRIBOELECTRIC CONTROL EFFECT

The present invention is situated within the field of triphenylmethane colorants. Triphenylmethane colorants are of great industrial importance in the production of blue printing inks.

U.S. Pat. No. 3,671,553 describes a specific process for preparing particularly pure triphenylmethane dyes. Nevertheless the products thus prepared contain up to 1% anilines (by HPLC) as residue from the synthesis.

U.S. Pat. No. 5,061,585 describes a specifically substituted triaminotriphenylmethane colorant as a positive charge control agent for electrophotographic toners and developers. This compound, however, has a relatively high level of environmentally critical impurities, particularly aniline and chlorobenzene. Aniline and chlorobenzene are reactants for the synthesis of the target substance which, as a result of incomplete reaction or excesses, are entrained as impurities throughout the production operation into the end product. For instance, the aniline content, measured by means of gas chromatography in headspace tubes (GC-HS) after thermal exposure at 120° C. for 1 hour, is between about 1000 and 2500 ppm, while by means of high-performance liquid chromatography (HPLC) on samples fully dissolved in methanol about 9000-10 000 ppm of aniline are measured. In the case of the compound described a distinct chlorobenzene peak is also detected. Triphenylmethane colorants having an aniline content of below 2000 ppm (by HPLC) have not been disclosed to date.

It is therefore an object of the invention to provide triaminotriphenylmethane colorants having a primary aromatic amine—in particular, aniline and m-toluidine—content of below 2000 ppm.

A further object is to provide a colorant having a significantly reduced level of inorganic cations and anions, such as $Na^+$, $K^+$, $Al^{3+}$, $SO_4^{2-}$ or $Cl^-$, for example. This reduced amount of inorganic ions can be measured, for example, by means of conductivity on an aqueous suspension of the product.

It has been found that this object can be achieved by a new kind of purifying and isolating process, as described below.

The invention provides a process for preparing a compound of the formula (1)

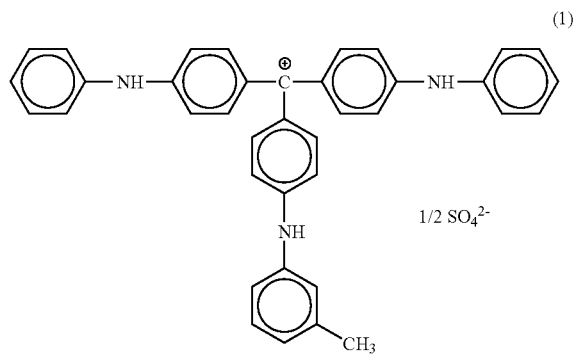

(1)

by Friedel-Crafts alkylation of p-chlorobenzotrichloride with chlorobenzene, substitution of the aromatically bonded chlorine by aniline and m-toluidine, alkaline hydrolysis to give the dye base, and precipitation as the dyebase sulfate of the formula (1), which comprises a) taking up the dyebase sulfate in water and subjecting it to a first steam distillation, then filtering it and drying, where appropriate, at from 50 to 180° C.,
b) adding water to the presscake or pasting the dyebase sulfate, where it has been dried, with water,
c) subjecting it to a further steam distillation and filtration
d) and to drying at from 50 to 180° C.

The invention further provides a compound of the formula (1) characterized by a primary aromatic amine—in particular, aniline and m-toluidine—content of less than 2000 ppm, preferably less than 1000 ppm, in particular less than 500 ppm, as determined by HPLC. For this purpose the compound of the formula (1) is dried at 120° C. for about 1 hour, dissolved in methanol, and analyzed by HPLC (eluent: methanol/water; column: RP-select B).

Additionally in the compound of the invention the said amine content, measured by means of GC-HS following thermal exposure at 120° C. for 1 hour, is below 800 ppm, preferably below 500 ppm, more preferably below 300 ppm.

Whereas the HPLC method detects the entire amine content of the substance (amine+amine sulfate), the GC-HS methods detects only the volatile fraction of the compounds in the gas space over the substance.

Furthermore, the chlorobenzene content after conditioning at 120° C. for 1 hour, as measured by means of GC-HS, is below 500 ppm, preferably below 150 ppm, more preferably below 70 ppm.

Moreover, the conductivity of a 5% aqueous dispersion of the product of the invention is between 0.001 and 1.5 mS/cm, preferably between 0.01 and 1 mS/cm.

The process of the invention is preferably conducted as follows: First of all p-chlorobenzotrichloride is reacted in a Friedel-Crafts reaction with chlorobenzene under the catalytic effect of aluminum trichloride. The aromatically bonded chlorine in the Friedel-Crafts product is then substituted by aniline and m-toluidine in solution in chlorobenzene. In the next step the resulting intermediate is hydrolyzed with aqueous sodium hydroxide solution to give the free "dye base". Thereafter the desired product is precipitated in the form of the "dyebase sulfate" from the chlorobenzene solution with aqueous sulfuric acid solution in a precipitation cascade with downstream filtration. The precipitated product is subsequently taken up in water, which is at a temperature of 70 to 100° C., preferably at 90 to 100° C., and subjected to subsequent steam distillation and also to a downstream aqueous filtration in order to remove the water-soluble aniline sulfate. The product can then be dried in a drying operation, in for example a rack dryer, forced air dryer or paddle dryer, or a combination thereof, at a temperature of from 50 to 180° C., preferably from 80 to 160° C., more preferably from 90 to 150° C., where appropriate under reduced pressure of down to $10^{-4}$ bar, at for example 50 to 100 mbar. Following filtration the product presscake is admixed with water in a ratio of from 1:1 to 1:1000, preferably from 1:2 to 1:100, more preferably from 1:2 to 1:50. Alternatively, if drying has been carried out, the dried product thus obtained is pasted up in the proportions described and again is subjected to a steam distillation and filtration. Drying can then be repeated under the same conditions as described above. The additional step of admixing the presscake with water or the step of pasting up the dried material with water, followed by the steam distillation and filtration, can be repeated from 1 to 10 times, preferably from two to four times, with the drying of the presscake being carried out as described above in every case after the final repetition.

In order to raise the efficiency of the removal of the impurities from the product it may be sensible to carry out wet grinding of the aqueous product suspension before the first steam distillation and/or before one or more further steam distillations. This wet grinding operation can be carried out, for example, by means of a toothed disk mill, pinned disk mill or bead mill, giving a particle size $d_{50}$ of from 5 nm to 1 mm, preferably from 1 µm to 600 µm, for the ground particles in the suspension. This step increases the access of the water to the impurities in the enclosed particles and so makes the removal by means of steam distillation and aqueous filtration more efficient.

The dried dyebase sulfate can subsequently be adjusted to a desired particle size by grinding. Examples of advantageous apparatus here include air jet mills, cutting mills, hammer mills, bead mills, and impact mills. The target particle size, determined by means of evaluation under a light microscope or by laser light diffraction and defined by the $d_{50}$ value, is appropriately between 0.01 µm and 1000 µm, preferably between 0.1 and 500 µm, and very preferably between 0.5 and 400 µm. It is particularly advantageous if the grinding operation results in a narrow particle size. Preference is given to a range $\Delta$ ($d_{95}$-$d_{50}$) of less than 500 µm, in particular less than 400 µm.

The compound of the invention contains predominantly crystalline fractions but also includes amorphous fractions.

The product of the invention can be used for pigmenting high molecular mass organic materials of natural or synthetic origin: for example plastics, resins, paints, paints, or electrophotographic toners and developers, and also inks, including printing inks. Examples of high molecular mass organic materials are cellulose ethers and cellulose esters, such as ethylcellulose, nitrocellulose, cellulose acetate or cellulose butyrate, natural resins or synthetic resins, such as polymerization resins or condensation resins, for example, amino resins, especially urea-formaldehyde and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone, and silicone resins, individually or in mixtures. Furthermore the product of the invention is also suitable for use as a colorant in rubber materials, office articles, wood coatings, and cleaning products, and also in artist's colors. Examples of typical printing inks are offset inks, illustration gravure inks, and printing inks for aqueous and solventborne packaging printing and for flexographic printing. The compound of the invention can be used as a colorant for printing inks, for example, by converting it into a sulfonated stage and aftertreating the product to form a powder or a paste. Examples of typical commercial names in this context are Reflex Blue R54, Reflex Blue A5H-R, Reflex Blue A5H-R31, Reflex Blue A6H-R, Reflex Blue A6H-R31 or Reflex Blue A6L-R31. Typical paints are automotive OEM and refinish paints, industrial paints, and architectural paints (e.g., polymer renders or emulsion paints). Typical plastics colorations are those, for example, in plasticized and unplasticized PVC (polyvinyl chloride), polyolefins or polystyrenes.

It matters not whether the high molecular mass organic compounds mentioned are in the form of plastic masses, melts or spinning solutions, paints, coating materials or printing inks. Depending on the intended utility it is found advantageous to use the product of the invention as a blend or in the form of preparations or dispersions. Based on the high molecular mass organic material for coloring, the product of the invention is used in an amount of from 0.05 to 70% by weight, preferably from 0.1 to 15% by weight.

The product of the invention is also suitable as a colorant and charge control agent in electrophotographic toners and developers, such as one-component or two-component powder toners (also called one-component or two-component developers), magnetic toners, liquid toners, polymerization toners, and specialty toners. Typical toner binders are addition-polymerization resins, polyaddition resins and polycondensation resins, such as styrene, styrene-acrylate, styrene-butadiene, acrylate, polyester, and phenol-epoxy resins, polysulfones, polyurethanes, individually or in combination and polyethylene and polypropylene which may contain further ingredients, such as charge control agents, waxes or flow assistants, or may be modified with these additives subsequently.

The product of the invention is additionally suitable as a colorant and charge control agent in powders and powder coating materials, especially in triboelectrically or electrokinetically sprayable powder coating materials which are employed for coating the surfaces of articles made, for example, of metal, wood, plastic, glass, ceramic, concrete, textile material, paper or rubber. As a charge control agent the product in this case brings about an increase in the intrinsic electrostatic characteristics of the powder or powder coating material. Typical powder coating resins employed are epoxy resins, carboxyl- and hydroxyl-containing polyester resins, polyurethane, and acrylic resins, together with customary hardeners. Resin combinations are also employed. For example epoxy resins are frequently used in combination with carboxyl- and hydroxyl-containing polyester resins. Typical hardener components (depending on the resin system) are, for example, acid anhydrides, imidazoles, and dicyandiamide and derivatives thereof, blocked isocyanates, bisacylurethanes, phenolic resins and melamine resins, triglycidyl isocyanurates, oxazolines, and dicarboxylic acids.

The blue colorant used in accordance with the invention can also be combined with further positive or negative charge control agents in order to obtain good performance chargeabilities, the overall concentration of the charge control agents being appropriately between 0.01 and 70% by weight, preferably between 0.05 and 20% by weight, more preferably between 0.1 and 5% by weight, based on the total weight of the electrophotographic toner, developer, powder or powder coating material.

Examples of suitable further charge control agents include the following: other triphenylmethanes; ammonium and immonium compounds, iminium compounds; fluorinated ammonium compounds and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n)arenes, cyclically linked oligosaccharides (cyclodextrins) and their derivatives, especially boron ester derivatives, interpolyelectrolyte complexes (IPECs); polyester salts; metal complex compounds, especially salicylate-metal complexes and salicylate-nonmetal complexes, salts of ionic structural silicates, hydroxycarboxylic acid-metal complexes and hydroxycarboxylic acid-nonmetal complexes, benzimidazolones; azines, thiazines or oxazines which are listed in the Colour Index as Pigments, Solvent Dyes, Basic Dyes or Acid Dyes.

Particular preference is given to the following charge control agents, which, individually or in combination with one another, can be combined with the blue colorant used in accordance with the invention:

triphenylmethanes, as described for example in U.S. Pat. No. 5,061,585;

ammonium compounds and immonium compounds, as described for example in U.S. Pat. No. 5,015,676;

fluorinated ammonium compounds and fluorinated immonium compounds, as described for example in U.S. Pat. No. 5,069,994; biscationic acid amides, as described for example in WO 91/10172; diallylammonium compounds, as described for example in DE-A-4 142 541, DE-A-4 029 652 or DE-A-4 103 610;

aryl sulfide derivatives, as described for example in DE-A-4 031 705;

phenol derivatives, as described for example in EP-A-0 258 651; phosphonium compounds and fluorinated phosphonium compounds, as described for example in U.S. Pat. No. 5,021,473 and U.S. Pat. No. 5,147,748;

calix(n)arenes, as described for example in EP-A-0 385 580;

benzimidazolones, as described for example in EP-A-0 347 695;

cyclically linked oligosaccharides, as described for example in DE-A-4 418 842;

polyester salts, as described for example in DE-A-4 332 170;

cyclooligosaccharide compounds, as described for example in DE-A-1 97 11 260;

interpolyelectrolyte complexes, as described for example in DE-A-197 32 995, salts of ionic structural silicates, as described for example in PCT/EP 00/11217.

Additionally suitable, particularly for liquid toners, are surface-active, ionic compounds and what are called metal soaps.

Particularly suitable are alkylated arylsulfonates, such as barium petronates, calcium petronates, barium dinonyinaphthalenesulfonates (basic and neutral), calcium dinonylsulfonate or sodium dodecylbenzenesulfonate, and polyisobutylenesuccinimides (Chevron's Oloa 1200).

Also suitable are soya lecithin and N-vinylpyrrolidone polymers.

Also suitable are sodium salts of phosphated monoglycerides and diglycerides with saturated and unsaturated substituents, AB diblock copolymers of A: polymers of 2-N,N-dimethylaminoethyl methacrylate quaternized with methyl p-toluenesulfonate, and B: poly-2-ethylhexyl methacrylate.

Also suitable, especially in liquid toners, are divalent and trivalent carboxylates, especially aluminum tristearate, barium stearate, chromium stearate, magnesium octoate, calcium stearate, iron-naphthalite, and zinc naphthalite.

Also suitable are chelating charge control agents (EP 0 636 945 A1), metallic (ionic) compounds (EP 0 778 501 A1), phosphate metal salts, as described in JA 9 (1997)-106107. Also suitable are azines of the following Colour Index Numbers: C.I. Solvent Black 5, 5:1, 5:2, 7, 31, and 50; C.I. Pigment Black 1, C.I. Basic Red 2, and C.I. Basic Black 1 and 2.

The blue colorant used in accordance with the invention, alone or in combination with other such colorants or with further charge control agents specified above, is incorporated in a concentration of from 0.01 to 50% by weight, preferably from 0.05 to 20% by weight, more preferably from 0.1 to 5.0% by weight, based on the total mixture, into the binder of the respective toner, developer, paint, powder coating material, electret material, or polymer requiring electrostatic separation, this incorporation taking place homogeneously, achieved for example by extrusion or kneaded incorporation, by bead milling or with an Ultraturrax (high-speed stirrer).

The compounds used in accordance with the invention can be added in the form of dried and ground powders, dispersions or solutions, presscakes, masterbatches, preparations, prepared pastes, as compounds applied from aqueous or non-aqueous solution to suitable carriers, such as silica gel, or mixed with such carriers, $TiO_2$, $Al_2O_3$, carbon black, for example, or can be added in some other form. It is likewise also possible for the compounds used in accordance with the invention to be added in principle during the actual preparation of the respective toner polymer matrix, i.e., in the course of its addition polymerization, polyaddition or polycondensation, and also during the preparation of polymerization toners—for example, during the suspension polymerization or emulsion polymerization or during the aggregation of the polymer systems to form toner particles.

The blue colorant of the invention and also the charge control agents can also be used in the form of fine aqueous, aqueous-organic or organic dispersions. The particle sizes ($d_{50}$ values) are between 1 nm and 1 µm, preferably between 50 and 500 nm. Appropriate concentrations of charge control agent are between 0.01 and 50% by weight, preferably between 0.1 and 30% by weight, based on the total weight of the dispersion. The viscosity of such a dispersion is appropriately between 0.5 and $10^6$ mPa s, preferably between 1 and 5000 mPa s.

In the case of aqueous or aqueous-organic dispersions the water used is preferably in the form of distilled or demineralized water. In the case of organic or aqueous-organic dispersions the organic medium used comprises one or more organic solvents, preferably from the group of the monohydric or polyhydric alcohols, their ethers and esters, e.g., alkanols, especially those having 1 to 4 carbon atoms, such as methanol, ethanol, propanol, isopropanol, butanol or isobutanol; dihydric or trihydric alcohols, especially those having 2 to 6 carbon atoms, e.g., ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, such as ethylene glycol monomethyl or ethyl or butyl ether, triethylene glycol monomethyl or ethyl ether; ketones and ketone alcohols, such as acetone, methyl ethyl ketone, diethyl ketone, methyl isobutyl ketone, methyl pentyl ketone, cyclopentanone, cyclohexanone, and diacetone alcohol, for example; and amides, such as dimethylformamide, dimethylacetamide, and N-methylpyrrolidone, for example.

For the preparation of stable dispersions it is also possible, moreover, to use customary ionic or nonionic dispersing assistants, such as sulfonates, phosphates, polyphosphates, carbonates, silicates, hydroxides, metal soaps, polymers, such as acrylates, fatty acid derivatives, and glycoside compounds.

The dispersions may also include metal complexing agents, such as EDTA or NTA, for example.

The dispersions may, furthermore, comprise other customary additives, such as preservatives, biocides, antioxidants, cationic, anionic, amphoteric or nonionogenic surface-active substances (surfactants and wetting agents), devolatilizers/defoamers, and also viscosity regulators, e.g., polyvinyl alcohol, cellulose derivatives or water-soluble natural or synthetic resins and polymers as film formers or binders to increase the adhesiveness and abrasion resistance. pH regulators employed include organic and inorganic bases and acids. Preferred organic bases are amines, such as ethanolamine, diethanolamine, triethanolamine, N,N-dimethylethanolamine, diisopropylamine, aminomethylpropanol or dimethylaminomethylpropanol, for example. Preferred inorganic bases are sodium, potassium, and lithium hydroxide, and ammonia. Further possible constituents include hydrotropic compounds, such as formamide, urea, tetramethylurea, ε-caprolactam, ethylene glycol, diethylene glycol, triethylene glycol, polyethylene glycol, butylglycol, methyl cellosolve, glycerol, sugars, N-methylpyrrolidone, 1,3-diethyl-2-imidazolidinone, thiodiglycol, sodium benzenesulfonate, sodium xylenesulfonate, sodium toluenesulfonate, sodium cumenesulfonate, sodium benzoate, sodium salicylate or sodium butylmonoglycol sulfate.

The concentration of these dispersing assistants and/or customary additives in the dispersion is appropriately between 0.001 and 80% by weight, preferably between 0.01 and 50% by weight, based on the total weight of the dispersion.

In order to prepare electrophotographic color toners it is possible to add further colorants such as organic chromatic pigments, inorganic pigments or dyes, usually in the form of powders, dispersions, presscakes, solutions or masterbatches.

The organic chromatic pigments can be from the group of the azo pigments or polycyclic pigments or can be mixed crystals (solid solutions) of such pigments.

Preferred blue pigments and/or green pigments are copper phthalocyanines, such as C.I. Pigment Blue 15, 15:1, 15:2, 15:3, 15:4, 15:6, P. Blue 16 (metal-free phthalocyanine), or phthalocyanine with aluminum, nickel, iron or vanadium as the central atom, and also triarylcarbonium pigments such as Pigment Blue 1, 2, 9, 10, 14, 16, 56, 60, 61, 62, 68, 80; Pigment Green 1, 4, 7, 17, 36, 50 45; Orange pigments, such as P.O. 5, 13, 34, 36, 38, 43, 62, 68, 70, 72, 71, 74; Yellow pigments, such as P.Y. 12, 13, 14, 17, 74, 83, 93, 97, 111, 120, 122, 139, 151, 154, 155, 174, 175, 176, 180, 174, 185, 194, 213, 214; red pigments, such as P.R. 2, 3, 4, 5, 9, 38, 48, 53, 57, 112, 122, 144, 146, 147, 149, 168, 170, 175, 176, 177, 179, 181, 184, 185, 186, 188, 189, 202, 207, 208, 209, 210, 214, 219, 238, 253, 254, 255, 256, 257, 266, 269, 270, 272, 279; violet pigments, such as P.V. 1, 19, 23, 32, carbon black such as P. Black 7, 11, 33 or in their surface-modified form as described in U.S. Pat. No. 5,554,739, iron/manganese oxides; and also mixed crystals such as those, for example, of pigments described above such as C.I. Pigment Violet 19 and C.I. Pigment Red 122, and also azo-surface-modified pigments as described in WO 01/30919.

The mixtures can be prepared in the form of powders, granules, by mixing presscakes, spray-dried presscakes or masterbatches and also by dispersing (extrusion, kneading, roll-mill processes, bead mills, Ultraturrax, ultrasound) in the presence of a carrier material in solid or liquid form (aqueous and nonaqueous inks) and also by flushing in the presence of a carrier material. Where the colorant is used with high proportions of water or solvent (>5%), mixing can also take place at elevated temperatures, by subsequent cooling of the mixture mass with vacuum assistance. The flushing operation can take place in the presence or absence of organic solvents and of waxes.

Particularly appropriate for increasing the brightness but also for shading the hue are mixtures with organic dyes. Preferred such dyes include the following:

water-soluble dyes, such as Direct, Reactive, and Acid Dyes, and also solvent-soluble dyes, such as Solvent Dyes, Disperse Dyes, and Vat Dyes for example. Examples include the following: C.I. Reactive Yellow 37, Acid Yellow 23, Reactive Red 23, 180, Acid Red 52, Reactive Blue 19, 21, Acid Blue 9, Direct Blue 199, Solvent Yellow 14, 16, 25, 56, 62, 64, 79, 81, 82, 83, 83:1, 93, 98, 133, 162, 174, Solvent Red 8, 19, 24, 49, 89, 90, 91, 92, 109, 118, 119, 122, 124, 127, 135, 160, 195, 212, 215, Solvent Blue 44, 45, Solvent Orange 41, 60, 63, Disperse Yellow 64, Vat Red 41, Solvent Black 45, 27.

It is also possible to use dyes and pigments having fluorescent properties, such as ®Luminols (Riedel-de Haen), in order for example to product anticounterfeit toners. Furthermore, the colorants may also be used in a special wax-coated form, as described in EP-A-1 204 005, in combination with the charge control agents of the invention.

Inorganic pigments, such as $TiO_2$ or $BaSO_4$, for example, are used in mixtures for lightening. Also suitable are mixtures with effect pigments, such as pearlescent pigments, $Fe_2O_3$ pigments (®Paliochroms), and pigments based on cholesteric polymers, which exhibit different colors depending on the angle of observation.

Electrophotographic toners and powder coating materials as well may further comprise waxes. The term "wax" refers to a range of substances, natural or synthetically obtained, which generally have the following properties: they are kneadable at 20° C., ranging from firm to hard and fragile, from coarse to finely crystalline, and from transluscent to opaque, but not glasslike; they melt without decomposition at 40° C., are of relatively low viscosity, without stringing, at just a little above the melting point, have a highly temperature-dependent consistency and solubility, and can be polished under gentle pressure.

The following waxes are preferred: natural waxes such as plant waxes, e.g., carnauba wax, candellila wax, and animal waxes, e.g., beeswax, modified natural waxes, such as paraffin wax, microwaxes, semisynthetic waxes, such as montan ester waxes, or synthetic waxes, such as polyolefin waxes, e.g., polyethylene and polypropylene waxes, polyethylene glycol waxes, cycloolefin copolymer waxes, amide waxes, such as N,N'-distearylethylenediamine, zirconocene waxes, and chlorinated or fluorinated polyolefin waxes or polyethylene-polytetrafluorethylene wax mixtures.

Also of interest is an electrophotographic toner, powder or powder coating material containing from 30 to 99.99% by weight, preferably from 40 to 99.5% by weight, of a customary binder, for example, a styrene, styrene-acrylate, styrene-butadiene, acrylate, urethane, acrylic, polyester or epoxy resin or a combination of the last two, from 0.01 to 50% by weight, preferably from 0.05 to 20% by weight, more preferably from 0.1 to 5% by weight, of the product of the invention, and, if desired, from 0.001 to 50% by weight, preferably from 0.05 to 20% by weight, of a further colorant and/or charge control agent, based in each case on the total weight of the electrophotographic toner, powder or powder coating material.

The compound described in accordance with the invention can further be applied to free-flow agents as an additional charge control element in suspended form or in a dry blend. The compound described in accordance with the invention can also be used for a carrier coating.

The product of the invention is also suitable as a colorant in aqueous and nonaqueous inkjet inks and also in those inks which operate in accordance with the hot melt process. In this context it can also be used in combination with other inks in order to produce, for example, magenta, cyan, yellow or black inks.

Inkjet inks generally contain a total of from 0.5 to 15% by weight, preferably from 1.5 to 8% by weight, of the product of the invention (reckoned on a dry basis).

Microemulsion inks are based on organic solvents and water together if desired with a hydrotropic substance (interface mediator). Microemulsion inks generally contain from 0.5 to 15% by weight, preferably from 1.5 to 8% by weight, of the product of the invention, from 5 to 99% by weight of water and from 0.5 to 94.5% by weight of organic solvent and/or hydrotropic compound.

"Solvent based" inkjet inks contain preferably from 0.5 to 15% by weight of the product of the invention and from 85 to 99.5% by weight of organic solvent and/or hydrotropic compounds.

Hot-melt inks are based usually on waxes, fatty acids, fatty alcohols or sulfonamides which are solid at room temperature and liquefy on heating, the preferred melting range being between about 60° C. and about 140° C. Hot-melt inkjet inks consist for example essentially of from 20 to 90% by weight of wax and from 1 to 10% by weight of the product of the invention. Also present may be from 0 to 20% by weight of an additional polymer (as "dye dissolver"), from 0 to 5% by weight of dispersing assistant, from 0 to 20% by weight of viscosity modifier, from 0 to 20% by weight of plasticizer, from 0 to 10% by weight of tackifier, from 0 to 10% by weight transparency stabilizer (preventing crystallization of the waxes for example), and from 0 to 2% by weight of antioxidant. Typical additives and auxiliaries are described for example in U.S. Pat. No. 5,560,760.

The compound of the invention is also suitable, furthermore, as an agent for shading black, red, yellow or brown hues, for example, in toners, developers, printing inks, varnishes, plastics, rubber materials, paints, office articles, artist's colors or inkjet inks.

The product of the invention is also suitable, furthermore, as a colorant for color filters and also for both additive and subtractive color production, and additionally as a colorant and charge control agent for electronic inks or electronic paper ("e-paper"), which are known from the literature, such as, for example, from Shuichi Maeda, Kohei Gocho and Makoto Omodani, "Electrical Twisting Sticks in a Transparent Tube", Proceedings of the International Congress of Imaging Science 2002, Tokyo, pp. 507-508.

The compound described in accordance with the invention is also suitable, furthermore, for the surface modification of pigment particles as described for example in WO 01/30919 A1, U.S. Pat. No. 5,922,118 or U.S. Pat. No. 5,554,739.

The compound described in accordance with the invention, moreover, as a charge control agent may considerably enhance the charging behavior and charge stability properties of electret materials, especially electret fibers. Typical electret materials are based on polyolefins, halogenated polyolefins, polyacrylates, polyacrylonitriles, polystyrenes or fluoropolymers, such as polyethylene, polypropylene, polytetrafluoroethylene, and perfluorinated ethylene and propylene, or on polyesters, polycarbonates, polyamides, polyimides, polyether ketones, on polyarylene sulfides, especially polyphenylene sulfides, on polyacetals, cellulose esters, polyalkylene terephthalates, and mixtures thereof. Electret materials, especially electret fibers, can be used for example to filter (ultrafine) dust. The electret materials may acquire their charge through corona or tribo charging.

The compound described in accordance with the invention can also be used as a charge control agent in electrostatic separating operations, especially in operations to separate polymers. Absent charge control agents, the triboelectrical charging behavior of low density polyethylene (LDPE) and high density polyethylene (HDPE) is extremely similar. Following the addition of charge control agent, LDPE acquires a strongly positive charge and HDPE a strongly negative charge, and accordingly the two materials can be effectively separated. As well as applying the charge control agents to the exterior of the polymer it is also possible to incorporate them into the polymer, in order, for example, to shift the position of the polymer within the triboelectric voltage series and to obtain a corresponding separation effect. Other polymers can likewise be separated from one another in this way, such as polypropylene (PP) and/or polyethylene terephthalate (PET) and/or polyvinyl chloride (PVC), for example.

The compound described in accordance with the invention can also be used, furthermore, to separate salt minerals, by improving the substrate-specific electrostatic charging through its addition (surface conditioning).

Moreover, on account of its charge control properties, the compound described in accordance with the invention can also be used as an "electroconductivity providing agent" (ECPA) in inks for inkjet printers.

The analytical methods referred to are carried out as follows:

1) HPLC:
   Column: RP-select B;
   Eluent: methanol/water beginning with 30% methanol/70% water then graduating over the course of 20 minutes to 50% methanol, then to 100% methanol over the course of 10 minutes, then remaining constant at 100% methanol for 10 minutes;
   Temperature: 40° C.;
   Flow rate: 0.2 ml/minute;
2) Headspace+GC/MS:
   a) Headspace: 120° C., 60 minutes
   b) GC/MS
      column: HP-624 (VOC), (0.25 mm, 60 m);
      carrier gas: helium;
      oven: 40° C. (2 minutes), 250° C. (20 K/minute), 250° C. (30 minutes);
      Split ratio: 30:1

In the examples below, parts and percentages are by weight.

PREPARATION EXAMPLE 2.6 l of chlorobenzene and 600 g of aluminum chloride were combined in a flask with stirring at 25° C., after which 986 g of p-chlorobenzene trichloride were added in portions at max. 35° C. and the mixture was heated to 60° C., stirred for 6 hours and then cooled to room temperature. Thereafter, at from 30 to 40° C., 520 ml of m-toluidine were added to the mixture, which was slowly heated to 130° C. and then stirred at this temperature for 2 hours. Then 2.1 l of aniline were added over the course of 3 hours and the reaction temperature was raised to 160-165° C. The chlorobenzene was distilled off in this operation. In order to remove the residual chlorobenzene a gentle to moderate vacuum was applied at from 160 to 165° C. Finally the mixture was cooled again and the vacuum was removed.

Then a second flask was charged with 3.3 l of 33% strength sodium hydroxide solution, the reaction mixture from the first flask was added with stirring at about 95° C., and this mixture was stirred at 95° C. for 3 hours. Following the addition of 2 l of water to the reaction mixture and stirring, the lower, aluminate phase was separated off. Thereafter 9.2 l of chlorobenzene and 4 l of water were added to the mixture, which was heated at 50° C. with stirring and again left to settle for 1 hour. The lower, chlorobenzene phase, which contained the "blue base" was separated off and precipitated from 40% strength sulfuric acid solution in a precipitation cascade at from about 50 to 70° C., after which the "dyebase sulfate" obtained was filtered off. The precipitated and filtered dyebase sulfate was washed with water at 90 to 100° C. and subjected to a steam distillation at 100° C., to subsequent filtration and drying at approximately 110° C. on a rack dryer, to pasting of the dried product with ten times the amount by weight of water, and to a second steam distillation with subsequent filtration and drying at 110° C.

| Characterization: | |
|---|---|
| appearance: | dark blue powder |
| aniline content: | 180 ppm (GC-HS after 1 h/120° C.) |
| aniline content: | 290 ppm (HPLC in methanol/water, after 1 h/120° C.) |
| m-toluidine content: | <50 ppm (HPLC in methanol/water, after 1 h/120° C.) |
| chlorobenzene content: | 30 ppm (GC-HS after 1 h/120° C.) |
| tan δ (1 kHz): | 0.03 |
| specific resistance: | $5 \times 10^{13}$ Ωcm |
| crystallinity: | Peaks in the X-ray diffraction diagram at the following angles 2θ |

(CuKα radiation): 6.93° (moderate); 12.03° (moderate); 13.90° (moderate); 18.44° (strong); 21.13° (weak); 21.64° (weak); 22.45° (weak); 24.57° (weak); 28.14° (weak); 30.53° (weak); 32.42° (weak); the blue colorant of the invention, unlike the triphenylmethane dye known to date with a markedly higher impurity content, including for example aniline or chlorobenzene, does not give a (weak) peak at 2θ=6°;

IR spectrum: characteristic bands at the following wavenumbers ν[1/cm]: 3600-3300 (several bands, weak); 3300-2600 (several bands, weak); 2600-1700 (several bands, weak); 1650-1600 (one band, moderate); 1600-1550 (one band, strong); 1550-1450 (several bands, moderate); 1400-1300 (two bands, strong); 1300-1200 (several bands, moderate); 1200-1150 (one band, strong); 1150-1000 (several bands, moderate); 1000-400 (several bands, weak);

DSC: no decomposition up to 250° C. (under air atmosphere); decomposition peaks at 262° C. (weak), 295° C. (moderate), 315° C. and above (strong);

pH: 2.8 conductivity: 450 μS/cm residual moisture: 1.6% (Karl-Fischer)

particle size distribution: $d_{50}$=7.4 μm, $d_{95}$=17.2 μm (Coulter counter);

Use Example 1

1 part of the compound from the preparation example is incorporated homogeneously using a compounder over the course of 30 minutes into 99 parts of a toner binder (60:40 styrene-acrylate copolymer ®Almacryl B-1501). The resulting composition is then ground on a universal laboratory mill and subsequently classified on a centrifugal classifier. The desired particle fraction (4 to 25 μm) is activated with a carrier consisting of magnetite particles measuring from 50 to 200 μm which have been coated with 90:10 styrene-methacrylate copolymer.

Measurement is carried out on a customary q/m test setup. A screen with a mesh size of 45 μm is used to ensure that when the toner is blown out no carrier is entrained with it. The measurements are made at a relative atmospheric humidity of approximately 50%. As a function of the activation time the q/m figures [μC/g] indicated in the table below are recorded:

| Activation time | Charge q/m [μC/g] |
|---|---|
| 5 min. | +14 |
| 10 min. | +15 |
| 30 min. | +15 |
| 2 h | +16 |

Use Example 2

The procedure of Use Example 1 is repeated but with the further incorporation of 5 parts of an organic pigment (carbon black ®Mogul L, Cabot).

| | q/m [μC/g] | | | |
|---|---|---|---|---|
| Ex. | 5 min. | 10 min. | 30 min. | 120 min. |
| 2 | +10 | +12 | +13 | +14 |

The invention claimed is:

1. A composition comprising a compound of formula (1)

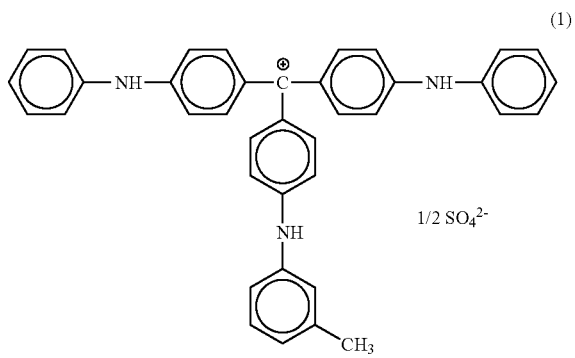

and an aniline, wherein the aniline is present in an amount less than 2000 ppm as determined by high performance liquid chromatography.

2. The composition as claimed in claim 1, wherein the aniline is present in an amount less than 1000 ppm.

3. The composition as claimed in claim 1, having a conductivity of between 0.001 and 1.5 mS/cm in 5% by weight aqueous dispersion.

4. The composition as claimed in claim 1, further comprising m-toluidine, wherein the toluidine is present in an amount less than 1000 ppm.

5. The composition as claimed in claim 1, having a conductivity of between 0.01 and 1 mS/cm in 5% by weight aqueous dispersion.

6. A colorant for pigmenting high molecular mass organic materials, office articles, and cleaning products comprising a composition as claimed in claim 1.

7. A pigmented composition comprising a composition as claimed in claim 1, wherein the pigmented composition is selected from the group consisting of plastics, resins, varnishes, emulsion paints, wood paints, printing inks, artists colors, rubber materials, inks, inkjet inks, powder coating materials, and electrophotographic toners and developers.

8. A colorant and charge control agent for an electrophotographic or electrophotographic developer comprising a composition as claimed in claim 1.

9. An agent for shading black, red, yellow or brown hues in a second composition comprising composition as claimed in claim 1, wherein the second composition is selected from the group consisting of toners, developers, printing inks, varnishes, plastics, rubber materials, paints, office articles, artists' colors and inkjet inks.

* * * * *